US007332051B2

(12) United States Patent
Silverbrook

(10) Patent No.: US 7,332,051 B2
(45) Date of Patent: *Feb. 19, 2008

(54) METHOD OF BINDING A PLURALITY OF PAGES

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/478,735

(22) Filed: Jul. 3, 2006

(65) Prior Publication Data

US 2006/0249250 A1 Nov. 9, 2006

Related U.S. Application Data

(63) Continuation of application No. 10/309,024, filed on Dec. 4, 2002, now Pat. No. 7,082,980, which is a continuation of application No. 09/721,857, filed on Nov. 25, 2000, now abandoned.

(30) Foreign Application Priority Data

Feb. 20, 2000 (AU) .................................... PR1575

(51) Int. Cl.

| | |
|---|---|
| ***B29C 65/48*** | (2006.01) |
| ***B32B 37/00*** | (2006.01) |
| ***B32B 38/14*** | (2006.01) |
| ***B42C 9/00*** | (2006.01) |
| *B42C 13/00* | (2006.01) |

(52) U.S. Cl. ...................... 156/277; 156/310; 156/384; 412/8

(58) Field of Classification Search ................ 156/277, 156/291, 310, 384, 556, 558, 559, 563, 566, 156/578; 412/8, 37, 900, 901

See application file for complete search history.

(56) References Cited

U.S. PATENT DOCUMENTS

| | | | | |
|---|---|---|---|---|
| 3,668,193 A | | 6/1972 | King | |
| 4,052,244 A | * | 10/1977 | Skoultchi | 156/310 |
| 4,342,613 A | | 8/1982 | O'Leary et al. | |
| 4,540,458 A | | 9/1985 | Baughman et al. | |
| 4,796,066 A | | 1/1989 | Morris et al. | |
| 4,797,048 A | | 1/1989 | Doery | |
| 4,958,187 A | | 9/1990 | Tsuchiya et al. | |
| 5,245,897 A | * | 9/1993 | Arnold et al. | 83/56 |
| 5,296,257 A | * | 3/1994 | Knop et al. | 427/10 |

(Continued)

FOREIGN PATENT DOCUMENTS

DE 2131256 A 1/1973

(Continued)

*Primary Examiner*—Philip Tucker
*Assistant Examiner*—Sing P Chan

(57) ABSTRACT

A method of binding a plurality of pages together is provided. The method comprises the steps of: conveying a plurality of pages along a paper path, each page being conveyed past a first adhesive applicator and a second adhesive applicator; applying a first part of a two-part binding onto a first portion of a first side of each page using the first adhesive applicator; applying a second part of the two-part binding adhesive onto a corresponding second portion of a second side of each page using the second adhesive applicator; and aligning and positioning each page such that a first portion of one page contacts a corresponding second portion of another page, thereby binding the pages together.

8 Claims, 9 Drawing Sheets

U.S. PATENT DOCUMENTS

| | | | | |
|---|---|---|---|---|
| 5,456,539 | A * | 10/1995 | Wright et al. | 400/82 |
| 5,501,560 | A | 3/1996 | Blume | |
| 5,531,429 | A * | 7/1996 | Clark | 270/58.11 |
| 5,582,570 | A | 12/1996 | Crowley | |
| 5,755,355 | A | 5/1998 | Timmerman et al. | |
| 6,106,666 | A | 8/2000 | Martin | |
| 6,530,339 | B1 | 3/2003 | Silverbrook | |
| 6,541,561 | B1 * | 4/2003 | Lythgoe | 524/551 |
| 6,712,924 | B2 | 3/2004 | Silverbrook | |
| 6,840,512 | B2 | 1/2005 | Silverbrook | |
| 6,863,105 | B2 | 3/2005 | Silverbrook | |
| 6,957,811 | B2 | 10/2005 | Silverbrook | |
| 2005/0109464 | A1 | 5/2005 | Silverbrook | |

FOREIGN PATENT DOCUMENTS

| | | | |
|---|---|---|---|
| DE | 2919931 | | 11/1980 |
| EP | 0543540 | A | 5/1993 |
| EP | 0677472 | A | 10/1995 |
| EP | 0734864 | A | 10/1996 |
| GB | 2303580 | A | 2/1997 |
| GB | 2303580 | A1 | 2/1997 |
| JP | 01-271368 | | 10/1989 |
| JP | 03-239781 | | 10/1991 |
| JP | 06-217072 | | 8/1994 |
| JP | 07-223387 | | 8/1995 |
| JP | 10-278447 | | 10/1998 |
| JP | 2000-016682 | A | 1/2000 |
| WO | WO 83/04215 | A | 12/1983 |
| WO | WO 98/10278447 | | 10/1998 |

* cited by examiner

METHOD OF BINDING A PLURALITY OF PAGES

CROSS-REFERENCE TO RELATED APPLICATION

This application is a Continuation of U.S. application Ser. No. 10/309,024 filed on Dec. 4, 2002, which is a Continuation of U.S. application Ser. No. 09/721,857, filed on Nov. 25, 2000 (now abandoned), all of which is herein incorporated by reference.

FIELD OF THE INVENTION

The following invention relates to the application of a two-part binding adhesive to pages in a binding process. More particularly, though not exclusively, the invention relates to the application of respective parts of a two-part binding adhesive to opposing surfaces of pages to be bound, such that upon pressing those pages together, the two parts of the two-part adhesive react and set.

It is well known to print individual pages of a volume to be bound, then to place all of the printed pages into a stack, to then crop one or more edges of the stack and to then bind the pages together by applying a binding adhesive to an edge of the stack of pages. This is a time consuming and labour-intensive process.

It would be more efficient to provide pre-cut, uniformly sized pages, to print one or both surfaces of each page and to provide a strip of binding adhesive to one or both surfaces of each page adjacent the edge to be bound, to accurately place the printed and pre-glued pages in a stack, and to press the pages adjacent the spine so that the adhesive binds the page edges together.

It would also be desirable to provide an apparatus and method for applying a first part of a two-part binding adhesive to one side of the page as it passes through a printer and the other part of a two-part adhesive to the other side of those pages as they pass through the printer.

OBJECT OF THE INVENTION

It is the object of the present invention to provide a method and apparatus for application of a two-part binding adhesive to pages to be bound.

DISCLOSURE OF THE INVENTION

There is disclosed herein apparatus comprising:

means for supporting and/or conveying a page, a first adhesive applicator to apply a first part of a two-part binding adhesive to one side of said page, and a second adhesive applicator to apply a second part of a two-part binding adhesive to the other side of said page.

According to a further embodiment of the present invention there is provided an apparatus comprising:

- a conveyor that conveys a page along a paper path;
- a first adhesive applicator to apply a first part of a two-part binding adhesive to one side of said page;
- a second adhesive applicator to apply a second part of a two-part binding adhesive to the other side of said page; and
- a support for the placement of said pages.

Preferably the page is conveyed along a path as the adhesive is applied.

Preferably the page is driven along the path by a pair of pinch rollers.

Preferably a print head is located after the pinch rollers.

Preferably the adhesive applicators are located after the print head.

Alternatively, the adhesive applicators are located before the print head.

Preferably the adhesive applicators are pagewidth adhesive applicators.

Preferably the print head is a pagewidth print head.

Preferably the print head is an ink jet print head applying droplets of ink to the page on demand.

Preferably the adhesive applicators do not contact the page as it moves along the path.

Alternatively, the adhesive applicators can contact the page and be moveable so as to move at a speed substantially equal to a speed at which the page is conveyed along the path.

Preferably if the adhesive applicators are moveable, they are pivotally mounted adjacent the path.

Alternatively, the adhesive applicators can be rollers.

The adhesive applicators might apply respective adhesive strips adjacent a leading edge of the page.

As an alternative, the adhesive applicators might apply an adhesive strip adjacent a trailing edge of the page.

Preferably a pair of print heads is provided, one at each side of the path, each applying printed matter to a respective side of the page.

The adhesive applicators might be formed integrally with the respective print heads.

There is further disclosed herein a method of applying a two-part adhesive to pages moving through a printer, the method comprising:

conveying pages along a path, printing matter on each page as the pages moves along the path, and applying respective parts of a two-part binding adhesive to respective sides of the page as it moves along the path.

BRIEF DESCRIPTION OF THE DRAWINGS

Preferred forms of the present invention will now be described by way of example with reference to the accompanying drawings wherein.

DESCRIPTION OF THE PREFERRED EMBODIMENTS

Figure 1:
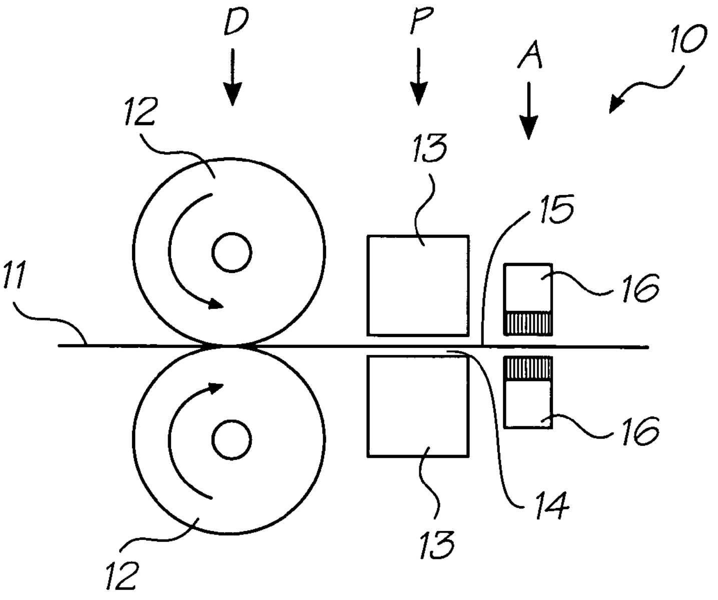
FIG. 1 is a schematic illustration of a page conveyed along a path and passing a pagewidth print head and an adhesive applicator.

In FIG. 1 of the accompanying drawings there is schematically depicted a path 10 of a page 11 passing through a printer incorporating an adhesive applicator.

Page 11 is driven to the right at a driving station D. Driving station D might comprise a pair of opposed pinch rollers 12 as shown. The page 11 then passes a printing station P and then an adhesive application station A. As an alternative, the adhesive application station A might precede the printing station P, but it is preferred that the adhesive application station follow the printing station so that adhesive on the page 11 does not clog the print head or print heads at printing station P.

For single sided page printing, the printing station P might comprise a single print head 13. The print head 13 might be a pagewidth drop on demand ink jet print head. Alternatively, the print head might be that of a laser printer or other printing device. Where the page 11 is to be printed on both sides, a pair of opposed print heads 13 might be provided.

Where the print heads 13 are ink jet print heads, wet ink 15 on page 11 might pass through the adhesive application station A.

An air cushion 14 at either side of the page 11 as it passes printing station P can be provided by means of air passing through an air flow path provided in each print head 13.

The adhesive application station A can comprise an adhesive applicator 16 at one or both sides of the page 11, depending upon which side or sides of the page to which adhesive is to be applied.

Figure 2:
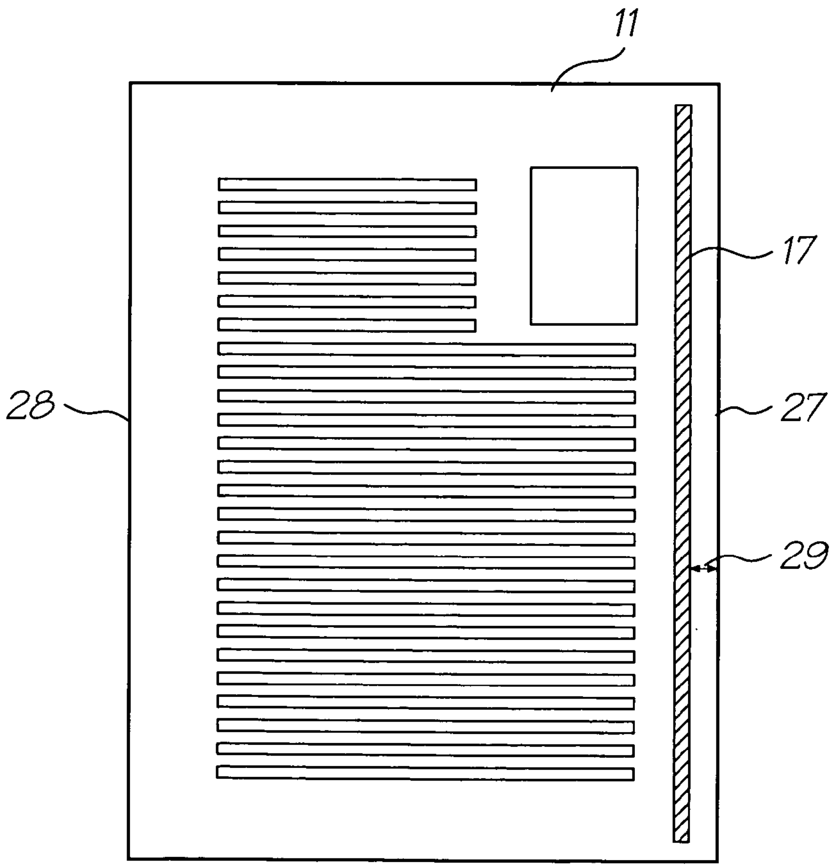
FIG. 2 is a schematic illustration of a page having an adhesive strip adjacent one edge thereof.

As shown in FIG. 2, a page 11 having matter printed thereon by printing station P also includes a strip 17 of adhesive as applied at adhesive application station A.

As can be seen, the strip 17 can be applied adjacent to the leading edge 27 of page 11. The application of strip 17 adjacent to the leading edge 28 is suitable for those situations where the adhesive applicator does not contact the page, or contacts the page at a velocity accurately matching that of the page 11 as it passes the adhesive application station A. Alternatively, the strip 17 could be applied adjacent to the trailing edge 28 of page 11 and this position might be more suited to adhesive applicators that make some form of physical contact with the page 11 as it passes adhesive application station A.

A margin 29 of about 1 to 2.5 mm is desirable between the strip 17 and edge 27 or 28 of page 11.

Figure 3:
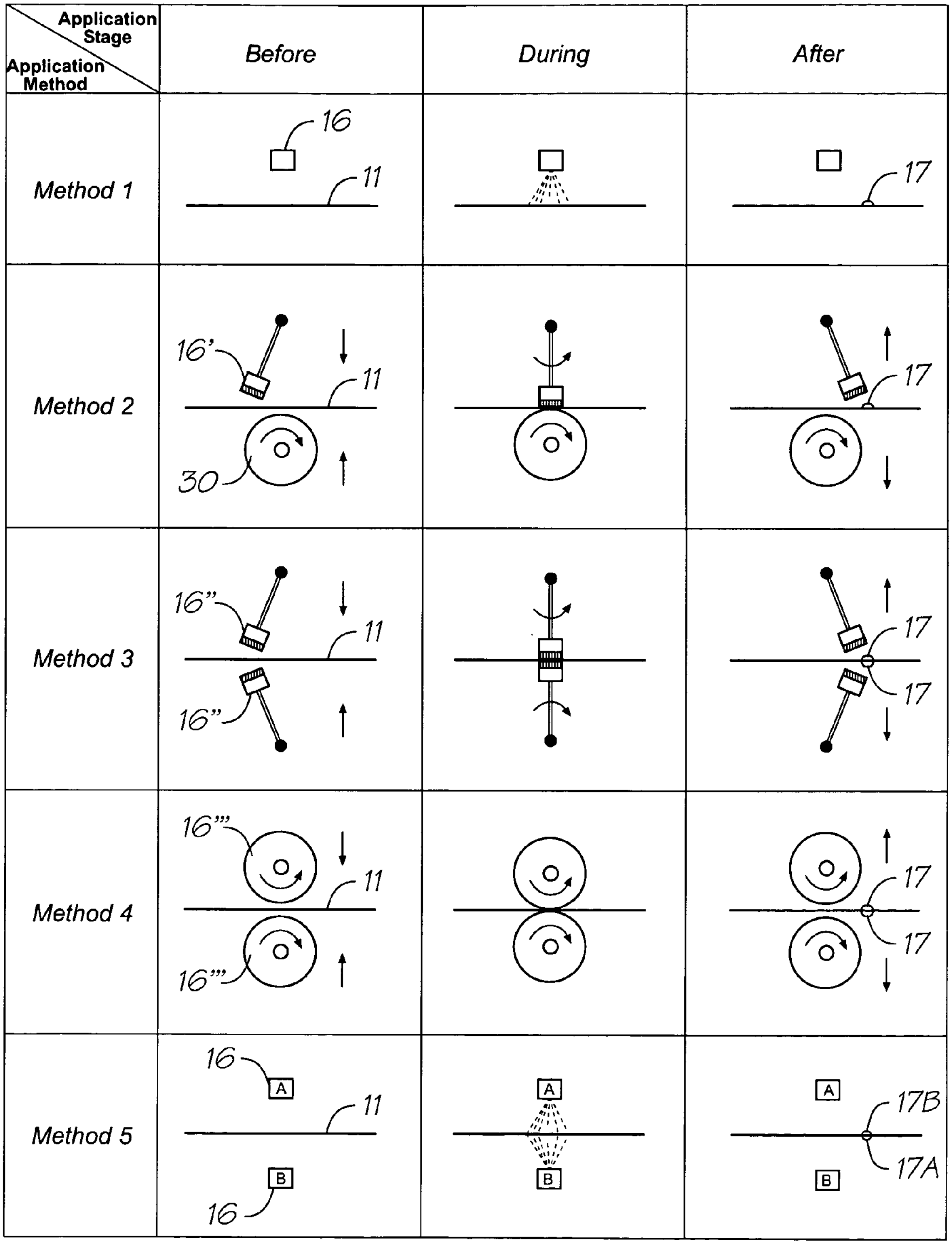
FIG. 3 is a table, schematically illustrating the principles of five alternative adhesive application methods.

Various methods of applying adhesive to the page 11 are envisaged, some of which are schematically depicted in FIG. 3.

Method 1 in FIG. 3 is a non-contact method of applying adhesive to the moving page 11. In this method, a stationary adhesive applicator 16 sprays adhesive on one side of page 11 as it passes the applicator. The adhesive applicator might be formed integrally with the print head 13 or might be located upstream or after the print head.

Method 2 also applies adhesive to one side of the moving page 11, although this time using a contact method. An adhesive applicator 16∋ is pivotally mounted about a fixed pivot point and is caused to move at a speed matching that at which the page 11 passes through the adhesive application station. A reaction roller 30 comes into contact with the underside of page 11 as the adhesive applicator 16∋ applies adhesive to the page.

Method 3 applies adhesive to both sides of a page 11 as it passes through the adhesive application station. A pair of pivotally mounted adhesive applicators 16∋∋ move pivotally at a speed corresponding with that at which the page 11 passes through the adhesive application station. They both come into contact with the page 11 and mutually counteract each other's force component normal to the page 11.

Method 4 employs a pair of adhesive applicator rollers 16∋∋∋spaced from either side of the page 11 until activated to apply adhesive whereupon they move toward and touch the page 11, leaving a strip of adhesive 17 at either side of the page. The rollers would mutually counteract each other's force component normal to page 11.

Method 5 employs a pair of adhesive spray applicators 16∋∋∋, one at either side of page 11. The applicators do not contact page 11. Each applicator would apply one part of a two-part adhesive to a respective side of page 11 so as to apply strips 17*a* and 17*b*. Like Method 1, Method 5 could employ an adhesive applicator formed integrally with the print head. That is, a channel for the flow of one part of a two-part adhesive might be provided in each print head.

Also, the use of a two-part adhesive could be beneficial in situations where there might be some delay in the printing/binding operation. For example, if there were a computer software or hardware malfunction part-way through a printing/binding operation, the use of a two-part adhesive could provide sufficient time within which to rectify the problem and complete the binding process.

Figure 4:
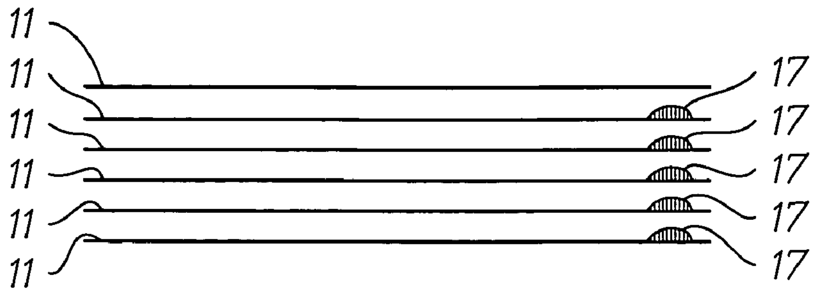
FIG. 4 is a schematic elevational view of a number of pages with all but the top page having a strip of adhesive applied to an upper surface adjacent to an edge to be bound.

FIG. 4 illustrates a stack of pages 11 with all but the top page provided with an adhesive strip 17 at an upper surface adjacent one edge to be bound.

Figure 5:
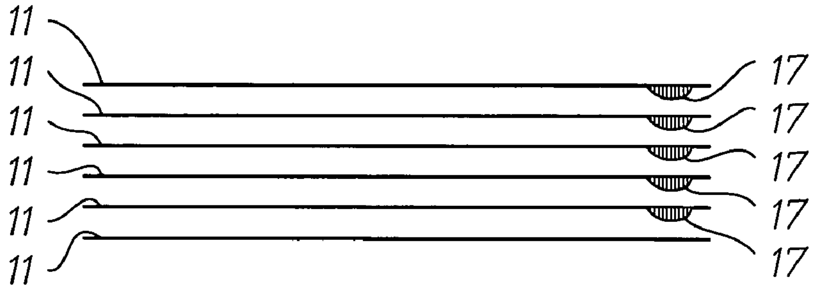
FIG. 5 is a schematic elevational view of a stack of pages with all but the bottom page having a strip of adhesive applied to a lower surface thereof adjacent to an edge to be bound.

An alternative is depicted in FIG. 5 wherein all but the bottom page has an adhesive strip 17 applied to its bottom surface adjacent an edge to be bound.

Figure 6:
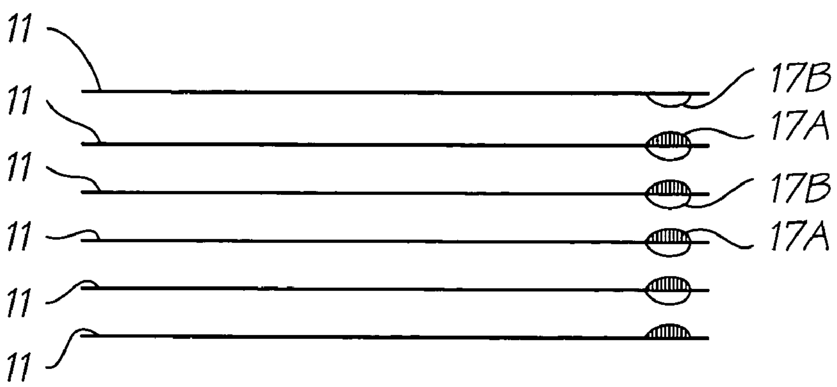
FIG. 6 is a schematic elevational view of a stack of pages with a first part of a two-part adhesive applied to the upper surface of all but the top page and a second part of a two-part adhesive applied to the bottom surface of all but the bottom page.

In FIG. 6, a stack of pages is shown with part A of a two-part adhesive applied to the upper surface of all but the top page and the second part of the two-part adhesive applied to the bottom surface of all but the bottom page.

When the stacks of pages of FIGS. 4 and 5 are pressed together, adhesion of the pages occurs once the adhesive 17 has dried.

When the pages 11 of FIG. 6 are pressed together, the respective parts of the two-part adhesive in strips 17*a* and 17*b* combine so as to react and set.

Where print head 13 is an ink jet print head, and non-contact adhesive application Methods 1 and 5 are employed, the adhesive strip 17 is applied to page 11 before ink on the page passing through the adhesive application station 10 has dried. Air passing through air gap 14 accelerates the drying process. That is, adhesive is applied to the page as it passes out of the print head 13. The velocity of the page 11 does not change as a result of the application of adhesive strip 17.

Where the strip 17 is applied alongside the leading edge 27 of the page 11, any alteration to the velocity of page 11 would adversely affect print quality. Hence application of adhesive strip 17 alongside the leading edge 27 is only possible without adversely affecting print quality using non-contact adhesive application methods or methods where the velocity of the adhesive applicator coming into contact with the page is very close to that of page 11.

Where the adhesive strip 17 is applied alongside the trailing edge 28 of page 11, a non-contact method or method of very close speed matching is also desired. For example, if the speed of the adhesive applicator of Methods 2 to 4 was faster than that at which the page 11 was passing the print head, the page could buckle.

A most desirable embodiment of the present invention would use a two-part adhesive and would incorporate the adhesive applicators within the print heads themselves. That is, a passage or passages for the flow of adhesive through the print head would be space and cost-effective.

The likelihood of adhesive "gumming" and blocking such channels would be diminished where a two-part adhesive was employed. That is, only one part of the two-part adhesive would pass through any particular channel or channels of the print head.

Where respective parts of a two-part adhesive are applied to opposed sides of pages 11, those respective parts could pass through dedicated channels in the respective print head at either side of the page. This would greatly reduce the likelihood of adhesive blockages in the flow channels.

The adhesive or respective parts of a two-part adhesive can be provided in a chamber of a replaceable ink cartridge providing ink to the print head.

The print head 13 should be as close a possible to the pinch rollers 12. This is because the rollers 12 provide a mechanical constraint upon the page 11 to enable accuracy of printing.

Figure 7:
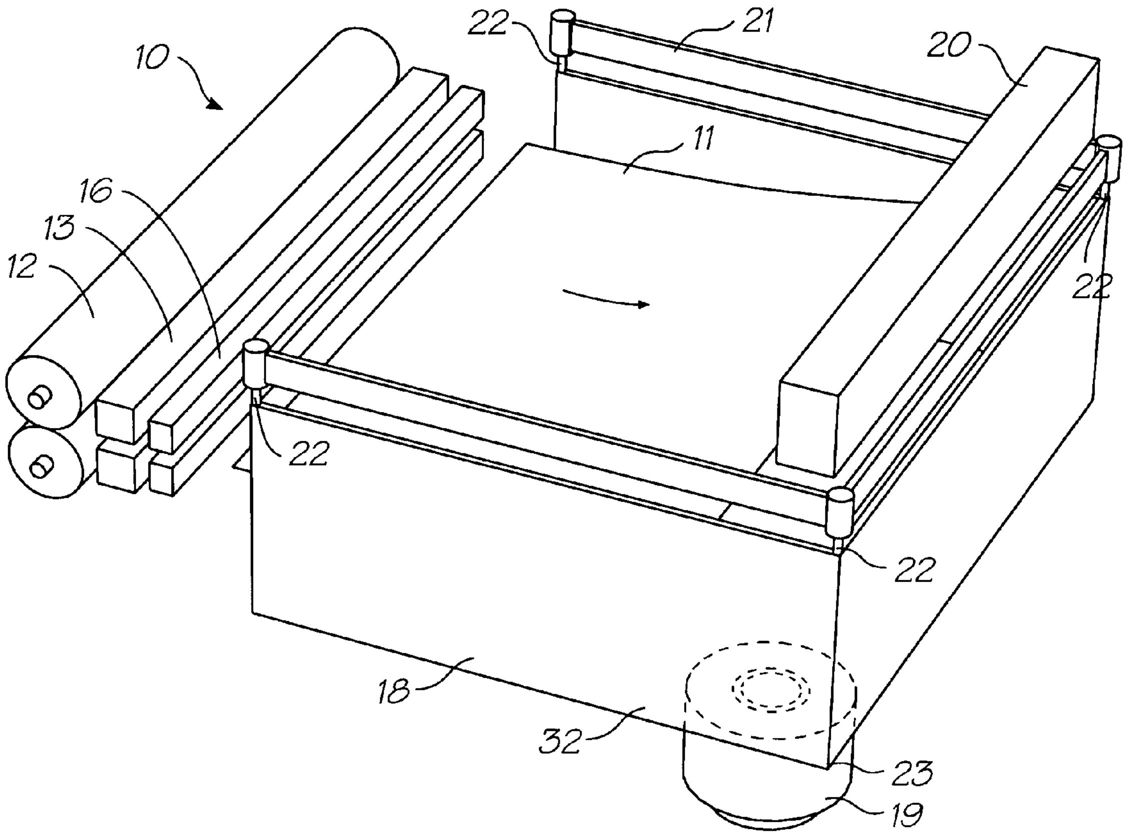
FIG. 7 is a schematic perspective view of a page binding support tray situated immediately down-line of the adhesive applicator.

The pinch rollers 12, print heads 13 and adhesive applicator 16 are illustrated in FIG. 7 alongside a page support tray 18. That is, the page support tray 18 receives pages 11 that exit the paper path 10. The tray 18 is suspended from a frame 21 by means of respective dampers 22 at each corner. The dampers could be elastomeric dampers or small hydraulic or pneumatic cylinders for example. The floor of tray 11 is not level. It has a lower-most corner 23 beneath which there is provided a vibrator 19. The vibrator 19 might be a subsonic vibrator (ie a vibrator having a frequency below 20 hz) or an out-of-balance electric motor for example. A binding press 20 is situated above the tray 18 over the at-rest position of the respective leading edge of the pages 11. However, as an alternative, the binding press 20 could be provided so as to be situated over the trailing edge of the pages.

Figure 8:
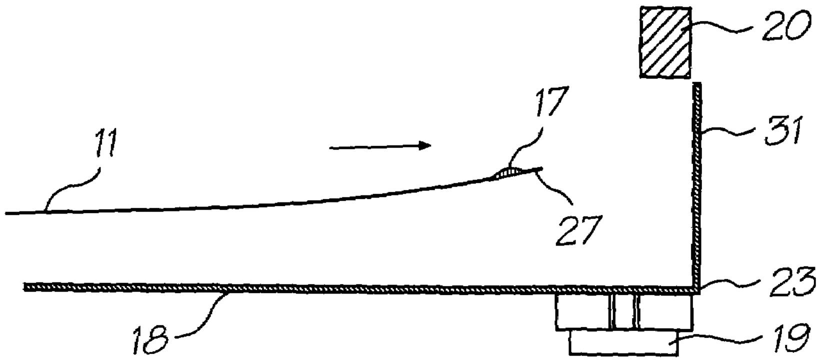
FIG. 8 is a schematic cross-sectional elevational view of the page binding support tray of FIG. 7 showing a first page having a strip of adhesive adjacent its edge at an upper surface en route thereto.
Figure 9:
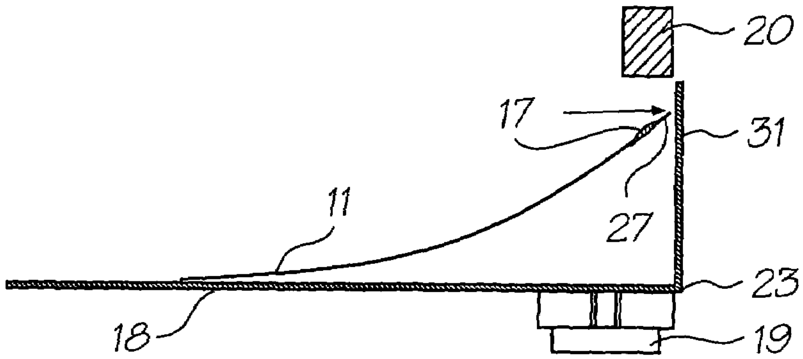
FIG. 9 is a schematic cross-sectional elevational view of the page binding support tray and page of FIG. 8, with the page closer to its rest position.
Figure 10:
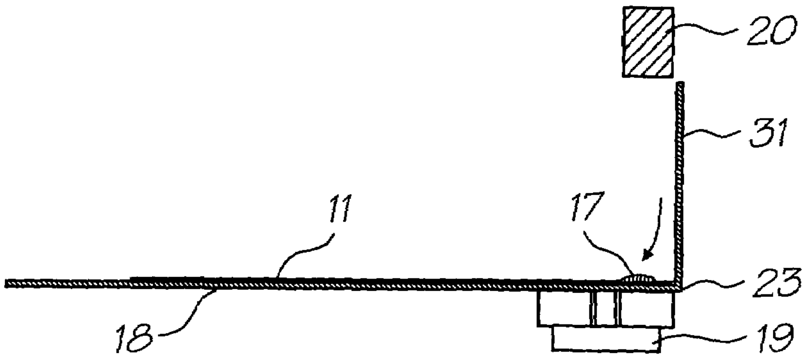
FIG. 10 is a schematic cross-sectional elevational view of the page binding support tray and page of FIGS. 8 and 9, with the page at rest thereon.

In FIG. 8 a first page 11 is shown in its trajectory toward tray 18. Page 11 has a strip of adhesive 17 on its upper surface adjacent the leading edge. The page 11 might tend to catch a pocket of air beneath it as it floats into position and the leading edge 28 might strike the vertical wall 31 as shown in FIG. 9. The vibrations of the tray 18 as a result of the vibrator 19 will cause the page 11 to come to rest with edge 27 alongside the lower edge of wall 23 and with a right angled edge of the page touching the front wall 32 of tray 18.

Figure 11:
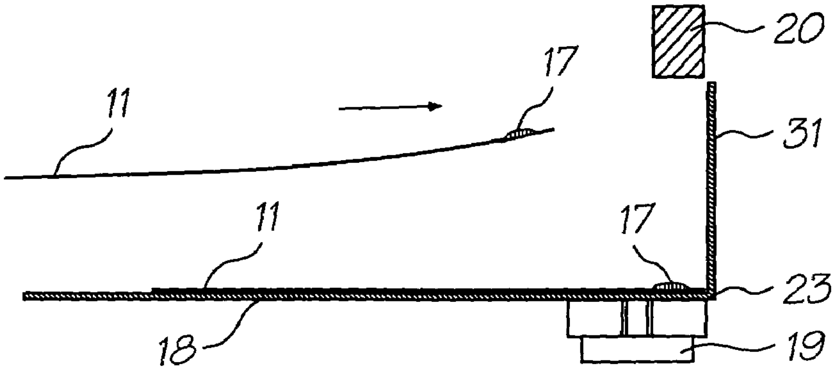
FIGS. 11, 12 and 13 are schematic cross-sectional elevational view of the page binding support tray showing a second page as it progresses to rest upon the first page.
Figure 12:
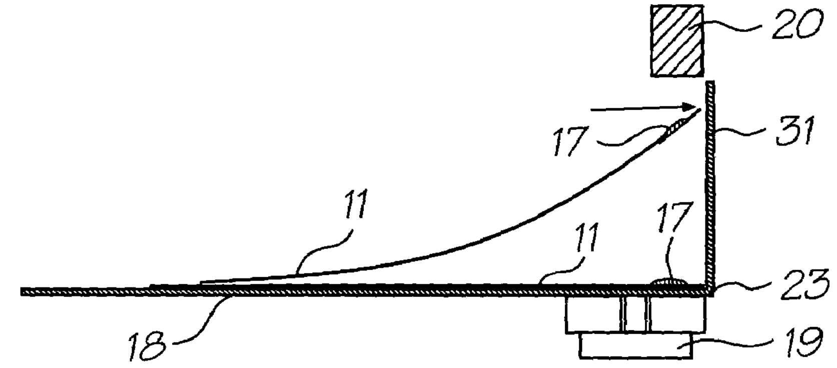
Figure 13:
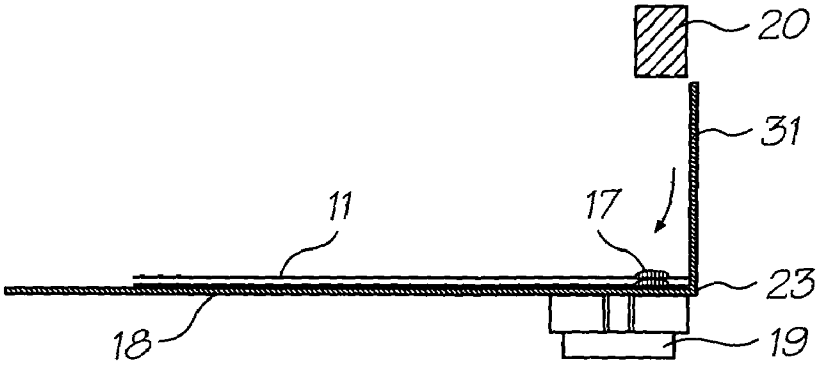
Figure 14:
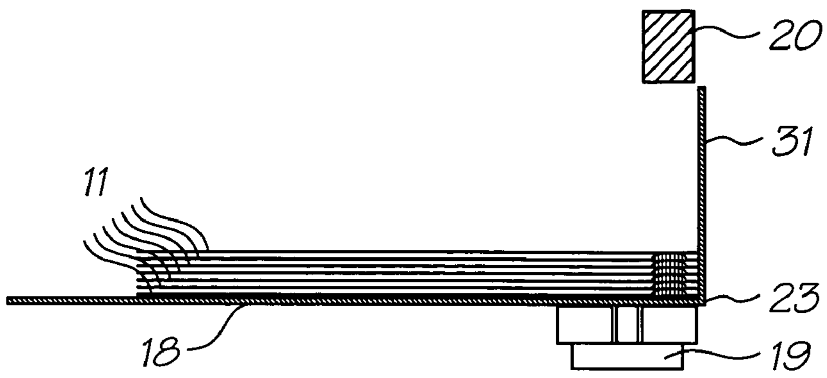
FIG. 14 is a schematic cross-sectional elevational view of the page binding support tray having a number of pages resting thereon to be bound, with all but the top page having an upwardly facing strip of adhesive adjacent an edge thereof.

In FIG. 11, a second page 11 is shown in its trajectory toward tray 18. In a motion similar to that of the first page, the second page comes to rest upon the first page in a position perfectly aligned therewith. The second page comes to rest into the position depicted in FIG. 13. Where the pages have the adhesive strip 17 applied to the upper surface, the final page is provided without any adhesive and it comes to rest at the top of the stack as depicted in FIG. 14. If, instead, the majority of pages 11 had the adhesive strip 17 applied to their bottom surface, the first page (ie the page at the bottom of the stack) would have no adhesive applied to it. This would be suitable for multiple binding compressions.

Figure 15:
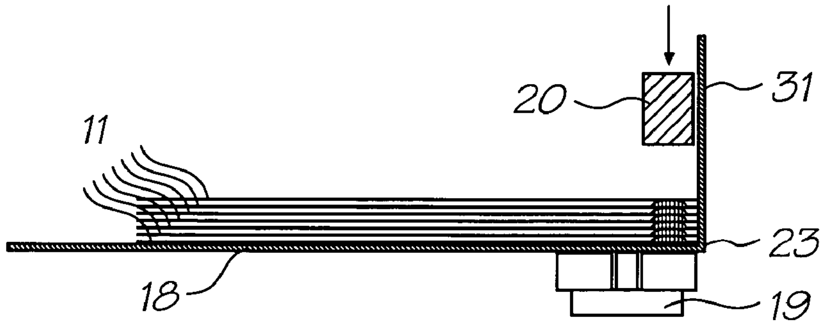
FIG. 15 shows the progression of a page-binding press toward the edge of the stacked pages.
Figure 16:
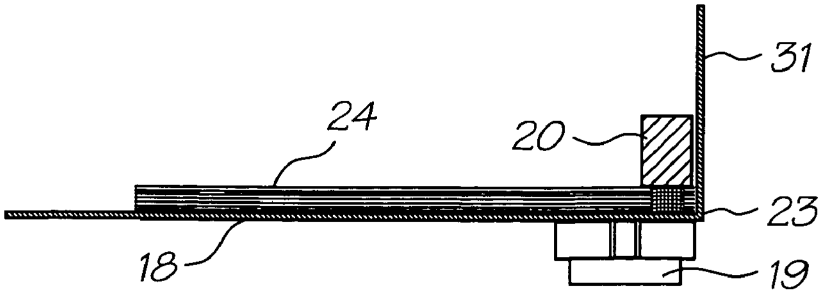
FIG. 16 shows the page binding support tray with pages bound along their edge by application of the binding press.

As shown in FIG. 15, the binding press 20 commences downward movement toward the stack of pages 11 over the aligned adhesive strips 17. The stack is then compressed to a bound volume 24 as shown in FIG. 16.

It should be noted that no subsequent edge trimming of the bound volume is required so long as standard-sized pages 11 had initially been used. This is because the vibrator 19 has aligned the pages into the lower-most corner 23 of tray 18 as described earlier.

Figure 17:
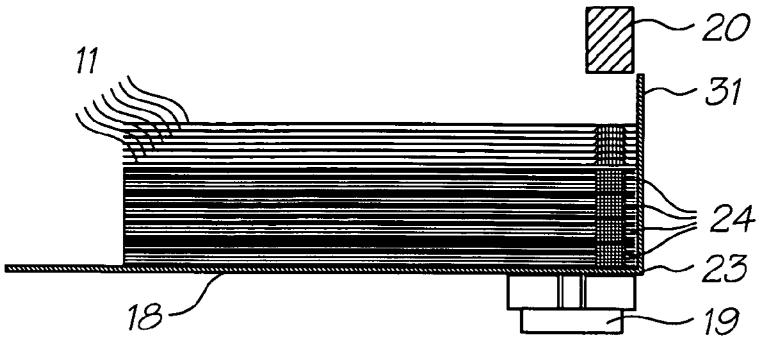
FIG. 17 is a cross-sectional elevational view of the page binding support tray having a number of individual volumes resting thereon, with a top volume ready to be pressed.
Figure 18:
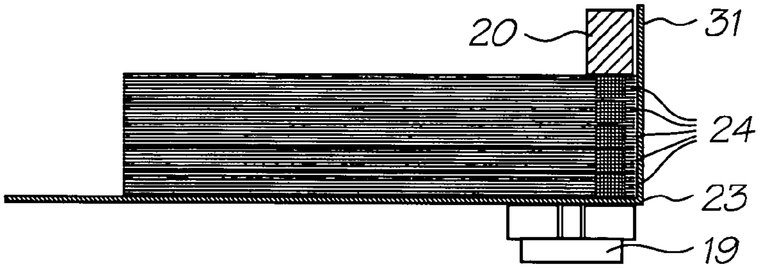
FIG. 18 is a schematic cross-sectional elevational view of the page binding support tray and volumes of FIG. 17, with all volumes having been pressed, one upon another.
Figure 19:
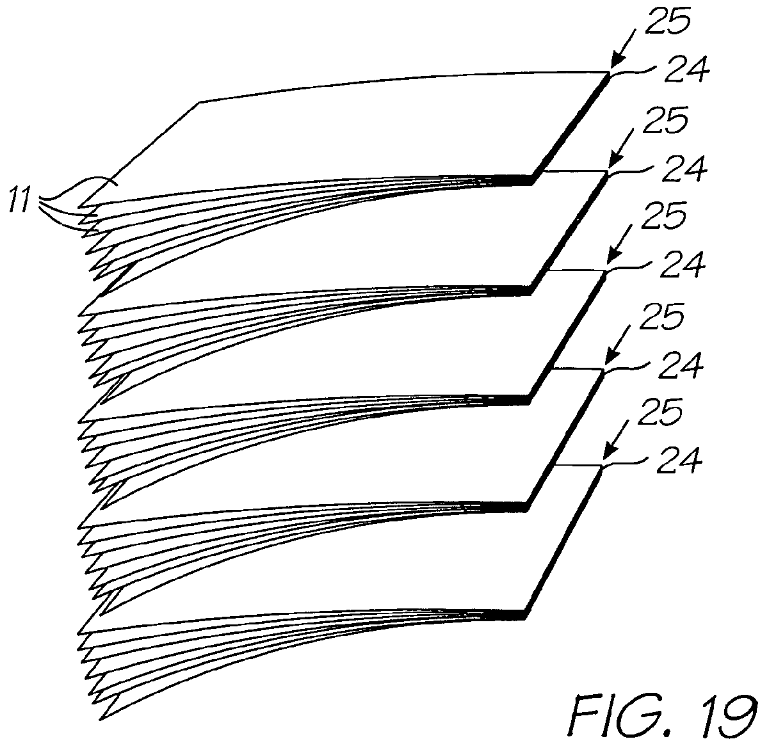
FIG. 19 is a schematic perspective illustration of a number of volumes having been bound.

In FIGS. 17 and 18, multiple volume 24 are shown stacked on upon another with the upper-most volumes being progressively compressed by repeated application of press 20.

Figure 20:
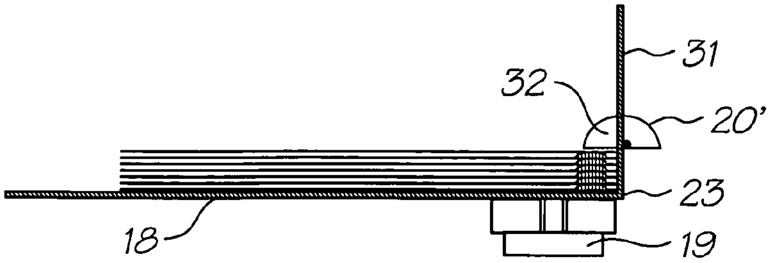
FIG. 20 is schematic elevational view of a page binding support tray having an alternative press.
Figure 21:
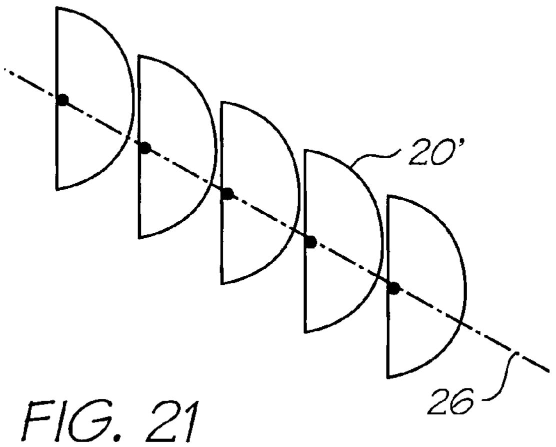
FIGS. 21 and 22 are schematic perspective views of a portion of the alternative press of FIG. 20.
Figure 22:
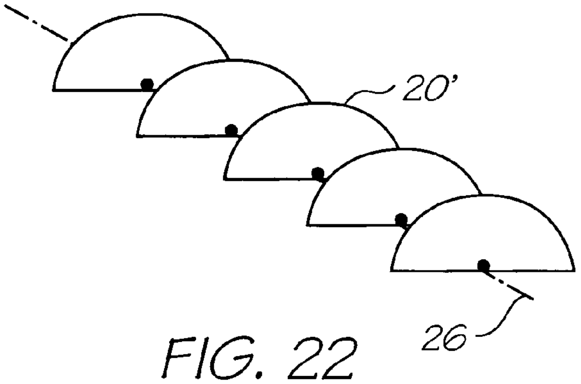

The binding press 20 is shown schematically in the Figures and could be pneumatically or hydraulically driven, or could be driven by other mechanical means such as rack and pinion, electrical solenoid or otherwise. An alternative embodiment as depicted in FIGS. 20, 21 and 22 incorporates a plurality of semicircular disks 20э each spaced apart, but fixedly mounted to a common rotatably driven shaft extending along an axis of rotation 26. Each disk 20э could pass through a respective vertical slot 32 formed in the end wall 31 of tray 18. That is, there would be as many vertical slots in wall 31 as there are disks 20э. The disks could commence in the orientation depicted in FIG. 21 and upon rotation of the shaft pivot to the orientation depicted in FIGS. 20 and 22 so as to press down upon the pages.

The tray 18 might be provided with a floor of adjustable height so as to always present the top page in the tray closely to the pressing device. This would reduce noise levels by minimizing the stroke length of the binding press 20. Furthermore, the binding press 20 could be fixed and the tray could be pushed upwardly toward it to press and bind the pages.

Figure 23:
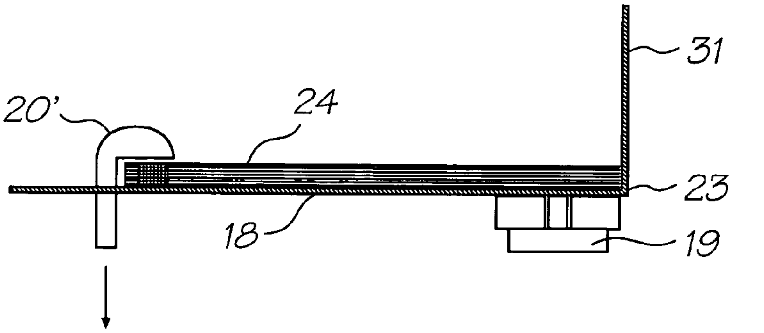
FIG. 23 is a schematic elevational view of a page binding support tray having an alternative press at a trailing edge of a stack of pages to be bound.

The floor of tray 18 can be driven so as to move downwardly as each page 11 is delivered thereto. This would ensure that the upper-most page always resided at the same level. This could result in reduced noise of movement of the press bar 20 as it need not move very far to effectively bind the pages.

Where the pages have applied thereto adhesive strips alongside the trailing edge 28, the press would be provided to the left as shown in FIG. 23. In this embodiment, a pressing bar 20ээ is provided. Any pressing arrangement could however be provided.

I claim:

1. A method of binding a plurality of printed pages together, said method comprising the steps of:

conveying a plurality of pages along a printing path, each page being conveyed past a first printhead and a second printhead, each of the first and second printheads being configured to eject both ink and adhesive;

applying a first part of a two-part binding adhesive onto a first portion of a first side of each page using said first printhead;

applying a second part of the two-part binding adhesive onto a corresponding second portion of a second side of each page using said second printhead; and aligning and positioning each page such that a first portion of one page contacts a corresponding second portion of another page, thereby binding said pages together.

2. The method of claim 1, further comprising the step of printing onto the first and second sides of said page respectively with the first and second printheads prior to aligning and positioning each page.

3. The method of claim 2, wherein said page is printed prior to applying said adhesives.

4. The method of claim 2, wherein said page is printed after applying said adhesives.

5. The method of claim 1 wherein the adhesives are applied by spraying onto said page.

6. The method of claim 1, wherein said first and second printheads apply respective adhesive strips adjacent a leading edge of each page.

7. The method of claim 1 wherein said first and second printheads apply respective adhesive strips adjacent a trailing edge of the page.

8. The method of claim 1, wherein the first and second printheads are disposed in an opposed relationship on either side of said printing path.

* * * * *